United States Patent
Chang

(10) Patent No.: US 8,985,147 B2
(45) Date of Patent: *Mar. 24, 2015

(54) FINE CERAMIC CONTROL VALVE

(71) Applicant: Chia-Po Chang, New Taipei (TW)

(72) Inventor: Chia-Po Chang, New Taipei (TW)

(73) Assignee: Hain Yo Enterprises Co. Ltd., Changhua (TW)

( * ) Notice: Subject to any disclaimer, the term of this patent is extended or adjusted under 35 U.S.C. 154(b) by 85 days.

This patent is subject to a terminal disclaimer.

(21) Appl. No.: 13/902,935

(22) Filed: May 27, 2013

(65) Prior Publication Data
US 2014/0345730 A1   Nov. 27, 2014

(51) Int. Cl.
*F16K 11/18* (2006.01)
*F16K 11/074* (2006.01)
*F16K 11/076* (2006.01)

(52) U.S. Cl.
CPC ............. *F16K 11/18* (2013.01); *F16K 11/0743* (2013.01); *E03C 2201/30* (2013.01); *F16K 11/076* (2013.01)
USPC .................. 137/625.41; 137/597; 137/625.42

(58) Field of Classification Search
CPC . F16K 11/0743; F16K 11/0787; F16K 11/18; F16K 11/076; E03C 2201/30
USPC ...................... 137/625.42, 597, 625.46; 4/677
See application file for complete search history.

(56) References Cited

U.S. PATENT DOCUMENTS

| | | | | |
|---|---|---|---|---|
| 5,896,601 A * | 4/1999 | Humpert et al. | ................... | 4/677 |
| 8,109,292 B2 * | 2/2012 | Bolgar et al. | ............ | 137/625.17 |
| 8,613,293 B2 * | 12/2013 | Bolgar et al. | ............ | 137/625.46 |
| 8,695,635 B1 * | 4/2014 | Wang | ........................ | 137/625.17 |
| 2007/0044850 A1* | 3/2007 | Pieters | ........................ | 137/597 |
| 2007/0235091 A1* | 10/2007 | Granot | ........................ | 137/597 |

\* cited by examiner

*Primary Examiner* — John Fox
*Assistant Examiner* — Michael R Reid
(74) *Attorney, Agent, or Firm* — Che-Yang Chen; Law Office of Michael Chen

(57) ABSTRACT

A ceramic control valve has a valve shell that orderly has a water control unit, an upper ceramic piece, a lower ceramic piece and a valve base connected underneath to avoid the abovementioned components from falling out. The ceramic control valve can change the water output style of the faucet without an additional handle, and the water output can be switched between front and top portions to effectively reduce the components of the faucets and simplify the assembly process.

7 Claims, 13 Drawing Sheets

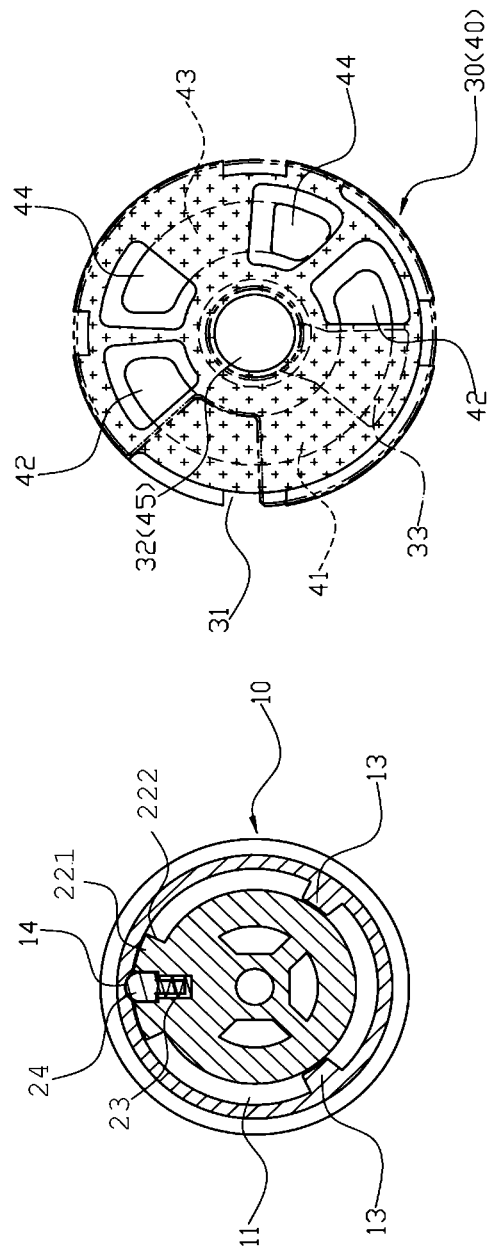

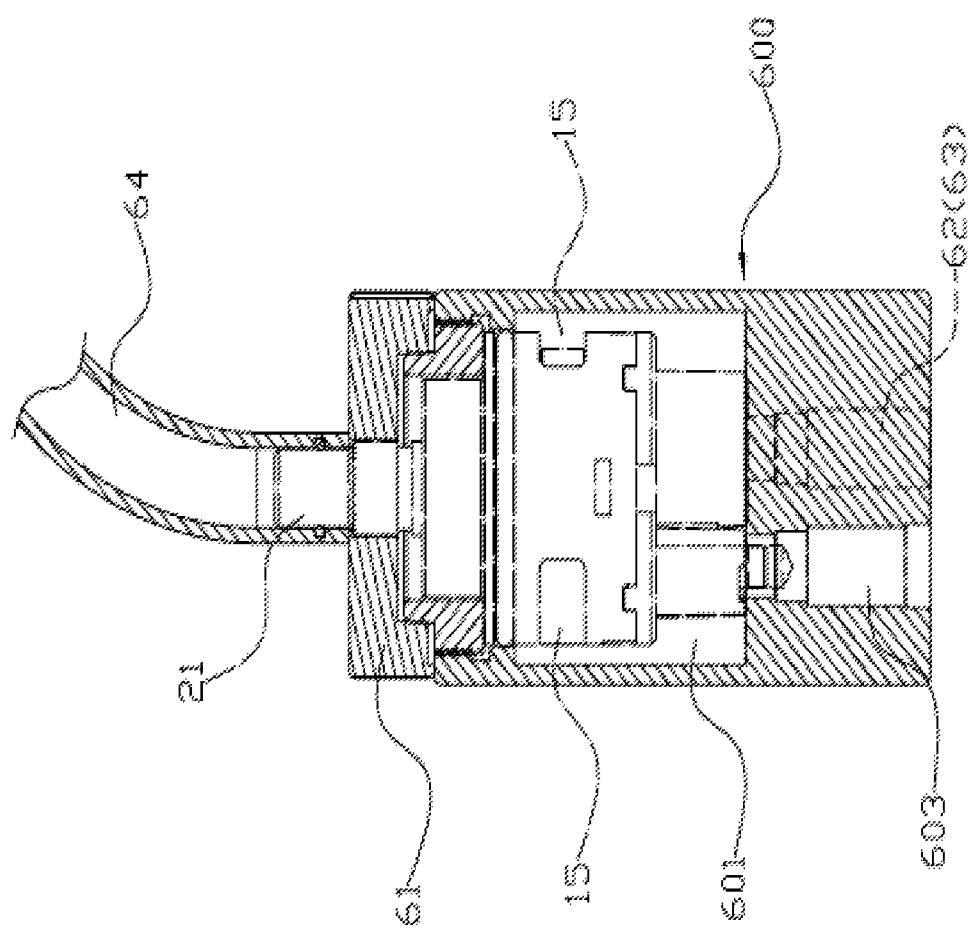

FINE CERAMIC CONTROL VALVE

FIELD OF THE INVENTION

The present invention relates to a ceramic control valve for a faucet, and more particularly to a ceramic control valve changing the water output status of the faucet without using an additional handle.

BACKGROUND OF THE INVENTION

Conventional faucets can usually provide water output from front end or from a showerhead. When these two modes of water output are used in the same faucet, a handle is employed to switch the water source. In other words, when the faucet is on, the water can directly flow from the front end of the faucet to a container underneath (such as a water basin or bathtub); and when the user wants to change the mode of water output, he/she lifts the handle to shut the water channel of the front end of the faucet, so the water can be guided to the showerhead. Meanwhile, the handle will not fall down until the water source is shut off because it is supported by the water pressure.

However, the handle is protruding from the faucet to reduce the aesthetic value thereof. Also, the handle may be inadvertently touched to change the water output status or cause unnecessary water output.

SUMMARY OF THE INVENTION

The technical problem the present invention wants to solve is that the handle of the faucet is protruding therefrom to reduce the aesthetic value thereof. Also, the handle may be inadvertently touched to change the water output status or cause unnecessary water output.

The present invention provides a ceramic control valve has a valve shell that orderly has a water control unit, an upper ceramic piece, a lower ceramic piece and a valve base connected underneath to avoid the abovementioned components from falling out. A receiving space is in the valve shell and a through hole on top of the valve shell. The water control unit is disposed in the receiving space and upper portion thereof is protruding out of the valve shell from the through hole. Two protruding blocks disposed in the valve shell are spaced with a predetermined rotating angle, an arc-shaped positioning portion is disposed between a rotating path between the two protruding blocks, and at least one water outlet in the receiving space passes through the valve shell. The water control unit has one tubular and hollow valve stick secured at a base to facilitate the rotation of the valve stick that drives the base to rotate. Outer periphery of the base has a connecting block with an arc edge, and both sides thereof can be used as a blocking wall. An engaging element pushed by a spring is located at center of the connecting block, and a driving leg is protruding from a base surface thereof. A water connecting hole is formed at an inner edge of the upper ceramic piece, and a water communicating hole is formed at center portion thereof. An expanding portion is disposed at one side of the water communicating hole, and through the formation of the expanding portion, the diameter of the upper portion of the water communicating hole is larger than the lower portion thereof. A connecting recessed slot is disposed at a top surface of the upper ceramic piece and when the upper ceramic piece is attached to a top surface of the lower ceramic piece and put into the receiving space together, the driving leg of the water control unit plugs into the connecting recessed slot. A bottom surface of the lower ceramic piece has one cold water channel and a hot water channel, wherein both sides of the cold water channel have a cold water through hole and both sides of the hot water channel have a hot water through hole to pass through the lower ceramic piece. A water outlet hole is at center of the lower ceramic piece and a plurality of engaging slots are formed at the edge thereof to secure the lower ceramic piece on the valve base. The valve base has a cold water inlet channel and a hot water inlet channel, wherein the cold water inlet channel and hot water inlet channel are connected to a first diverting slot and a second diverting slot to transport the cold and hot water to the other side. The valve base also has a hook protruding upwards to not only secure the lower ceramic piece, but also secure the valve shell, so that the first diverting slot and the second diverting slot can align with the cold water channel and the hot water channel. Also, a gasket is disposed in the cold water inlet channel, the hot water inlet channel, the first diverting slot and the second diverting slot.

Comparing with the prior arts, the present invention is advantageous because (i) the ceramic control valve can change the water output style of the faucet without an additional handle, and the water output can be switched between the front and top portions to effectively reduce the components of the faucets and simplify the assembly process; (ii) there is no additional handle protruding from the faucet to increase the aesthetic value of the faucet; and (iii) the faucet does not have to be operated with the additional handle to avoid unnecessary water output due to inadvertent touch of the additional handle.

BRIEF DESCRIPTION OF THE DRAWINGS

FIG. 6 illustrates a sectional view of the present invention.

FIG. 9 illustrates a schematic view of the relationship between the upper and lower ceramic pieces when the water is shut off.

FIG. 19 illustrates a sectional view of one embodiment of the faucet in use in the present invention.

DETAILED DESCRIPTION OF THE INVENTION

Figure 1:
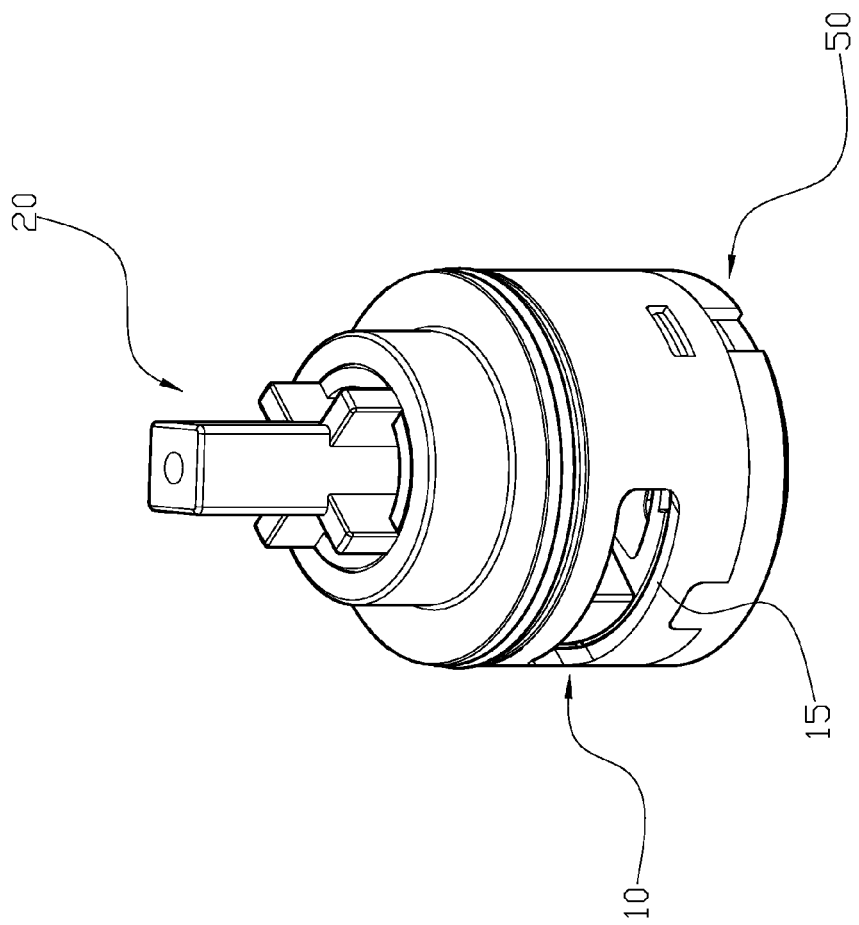
FIG. 1 illustrates a three-dimensional view of the present invention.
Figure 2:
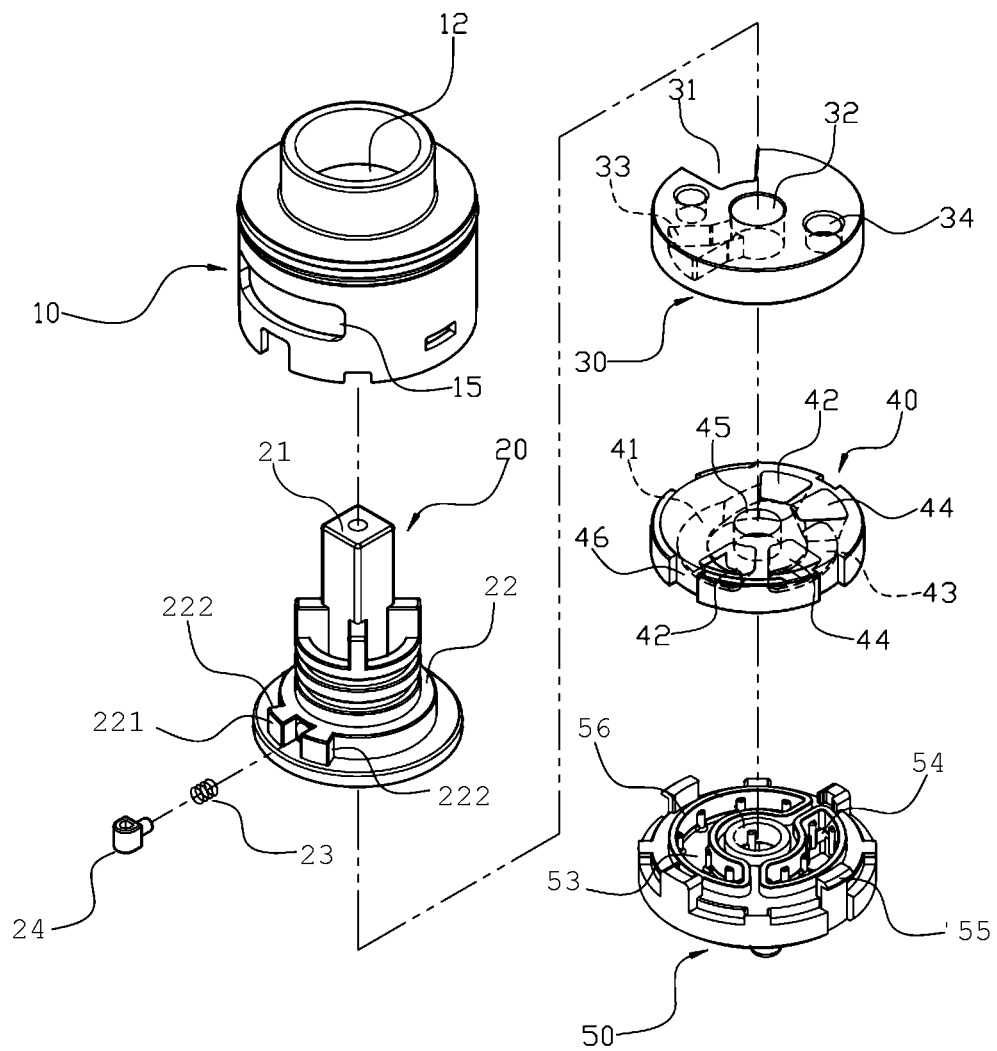
FIG. 2 illustrates a three-dimensional exploded view of the present invention.
Figure 3:
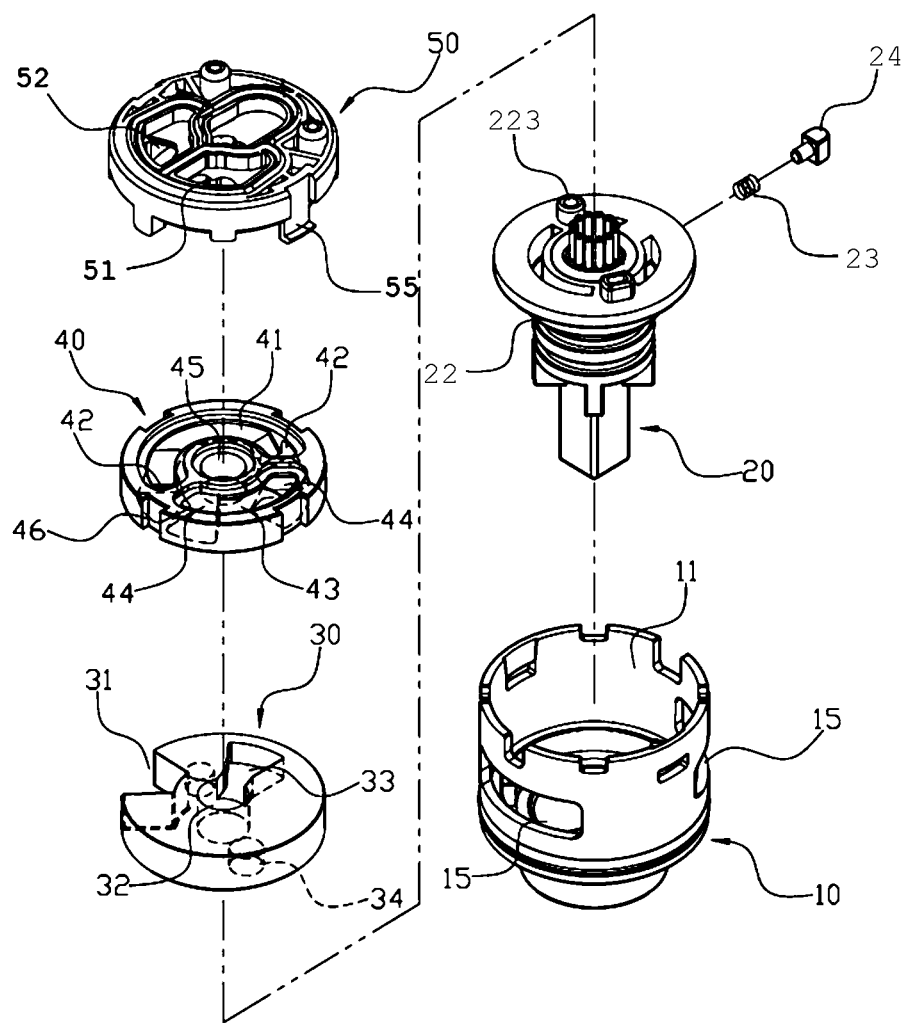
FIG. 3 illustrates a three-dimensional exploded view from another angle of the present invention.
Figure 5:
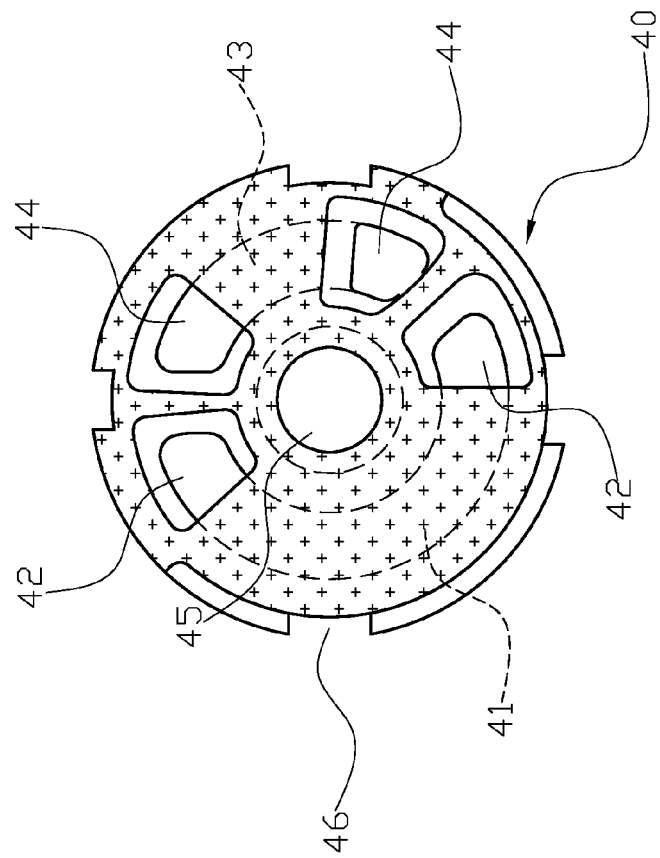
FIG. 5 illustrates a two-dimensional view of the lower ceramic piece in the present invention.
Figure 4:
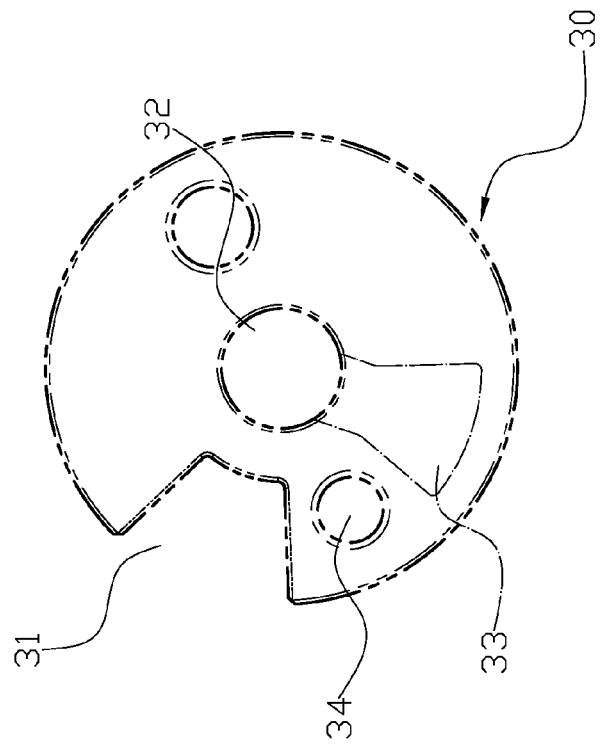
FIG. 4 illustrates a two-dimensional view of the upper ceramic piece in the present invention.

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 1 to 6, a ceramic control valve has a valve shell (10) that orderly has a water control unit (20), an upper ceramic piece (30), a lower ceramic piece (40) and a valve base (50) connected underneath to avoid the abovementioned components from falling out. A receiving space (11) is in the valve shell (10) and a through hole (12) on top of the valve shell (10). The water control unit (20) is disposed in the receiving space (11) and upper portion thereof is protruding out of the valve shell (10) from the through hole (12). Two protruding blocks (13) disposed in the valve shell (10) are spaced with a predetermined rotating angle, an arc-shaped positioning portion (14) is disposed between a rotating path between the two protruding blocks (13), and at least one water outlet (15) in the receiving space (11) passes through the valve shell (10). The water control unit (20) has one tubular and hollow valve stick (21) secured at a base (22) to facilitate the rotation of the valve stick (21) that drives the base to rotate. Outer periphery of the base has a connecting block (221) with an arc edge, and both sides thereof can be used as a blocking wall (222). An engaging element (24) pushed by a spring (23) is located at center of the connecting block (221), and a driving leg (223) is protruding from a base surface thereof. A water connecting hole (31) is formed at an inner edge of the upper ceramic piece (30), and a water communicating hole (32) is formed at center portion thereof. An expanding portion (33) is disposed at one side of the water communicating hole (32), and through the formation of the expanding portion (33), the diameter of the upper portion of the water communicating hole (32) is larger than the lower portion thereof. A connecting recessed slot (34) is disposed at a top surface of the upper ceramic piece (30) and when the upper ceramic piece (30) is attached to a top surface of the lower ceramic piece (40) and put into the receiving space (11) together, the driving leg (223) of the water control unit (20) plugs into the connecting recessed slot (34). A bottom surface of the lower ceramic piece (40) has one cold water channel (41) and a hot water channel (43), wherein both sides of the cold water channel (41) have a cold water through hole (42) and both sides of the hot water channel (43) have a hot water through hole (44) to pass through the lower ceramic piece (40). A water outlet hole (45) is at center of the lower ceramic piece (40) and a plurality of engaging slots (46) are formed at the edge thereof to secure the lower ceramic piece (40) on the valve base (50). The valve base (50) has a cold water inlet channel (51) and a hot water inlet channel (52), wherein the cold water inlet channel (51) and hot water inlet channel (52) are connected to a first diverting slot (53) and a second diverting slot (54) to transport the cold and hot water to the other side. The valve base (50) also has a hook (55) protruding upwards to not only secure the lower ceramic piece (40), but also secure the valve shell (10), so that the first diverting slot (53) and the second diverting slot (54) can align with the cold water channel (41) and the hot water channel (43). Also, a gasket (56) is disposed in the cold water inlet channel (51), the hot water inlet channel (52), the first diverting slot (53) and the second diverting slot (54).

Figure 7:
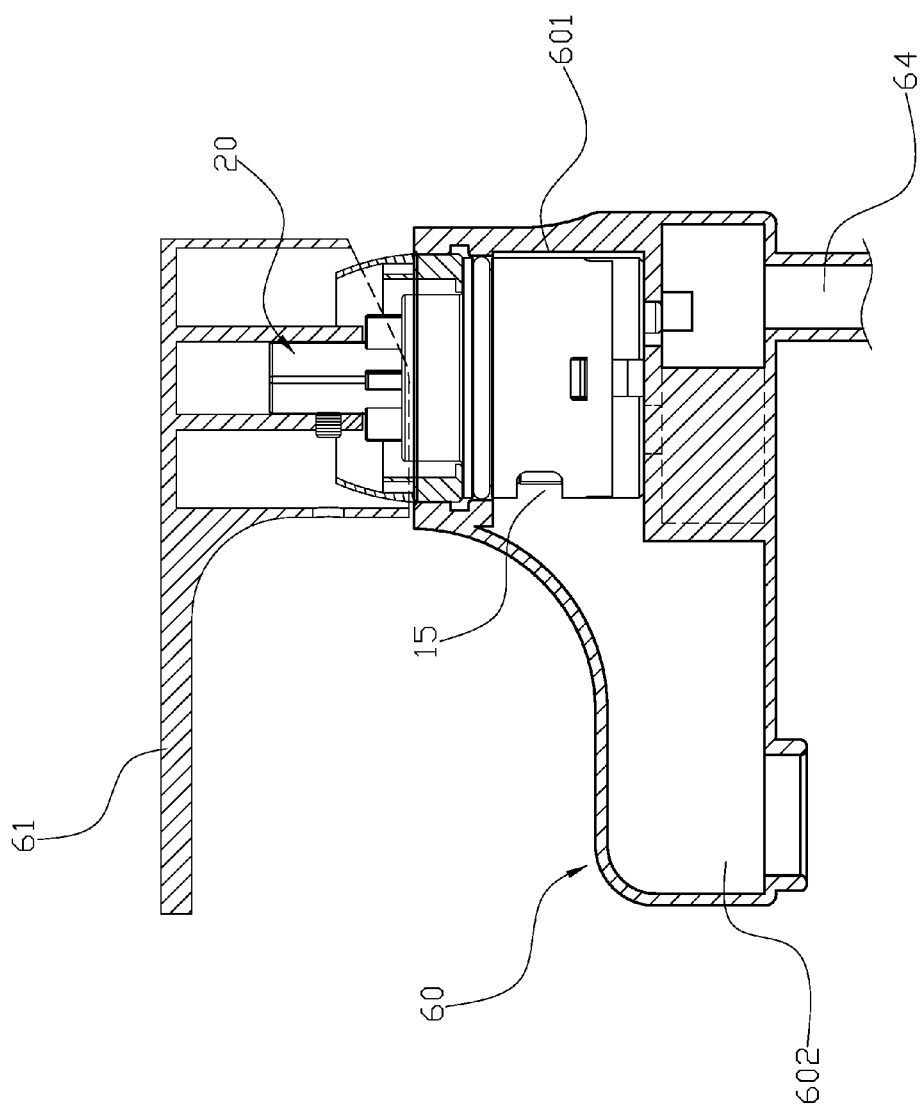
FIG. 7 illustrates a schematic view of the faucet in use in the present invention.
Figure 8:
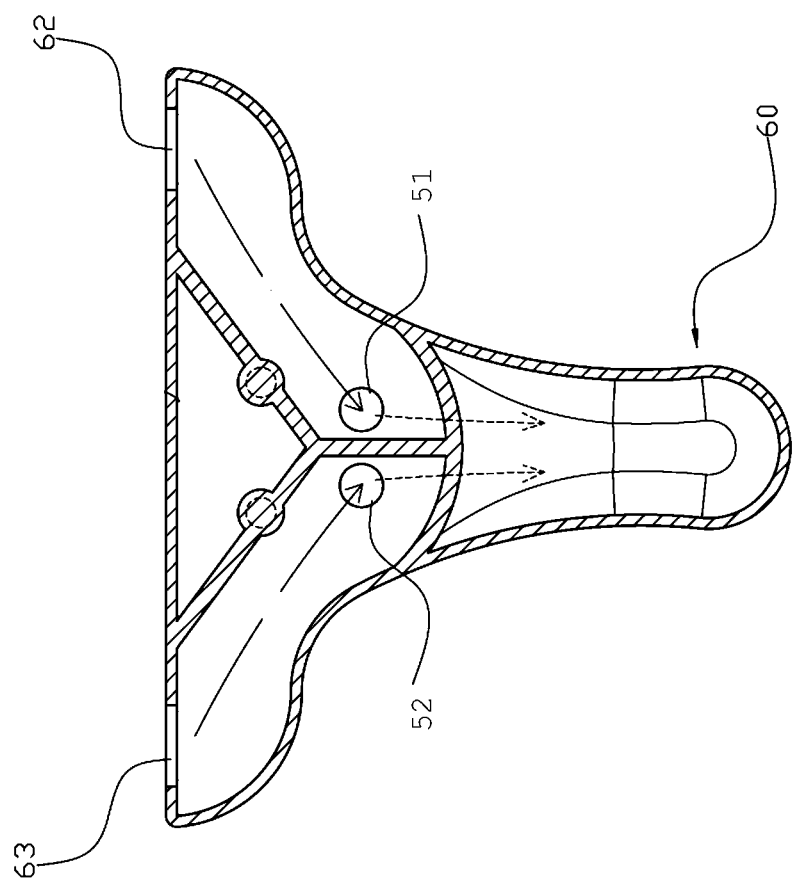
FIG. 8 illustrates a sectional view of the connection of the cold and hot water sources.

When in use, the ceramic control valve in the present invention is disposed in an isolated space (601) of a faucet (60), and the valve stick (21) of the water control unit (20) is connected to a handle (61) (see FIGS. 7 and 8). Through the operation of the handle (61), the ceramic control valve can control whether the water output is from the front or top of the faucet (60). Also, the temperature of the output water can also be controlled by adjusting the cold and hot water, and the cold water inlet channel (51) and the hot water inlet channel (52) are connected to a cold water source (62) and hot water source (63) respectively. The valve stick (21) can connect to a water spraying device through a connecting tube (64), and the water outlet (15) of the valve shell (10) is communicating with a front water output portion (602) of the faucet (60). When the handle (61) is not operated, the water control unit (20) is located at the center, so the engaging element (24) can be pushed into the positioning portion (14) by the spring (23) to be the starting point when in use. Meanwhile, the water connecting hole (31) of the upper ceramic piece (30) and the expanding portion (33) will misalign with the two cold water through holes (42) and two hot water through holes (44) of the lower ceramic piece (40) to block the cold and hot water to further shut of the faucet (60) (see FIG. 9).

Figure 11:
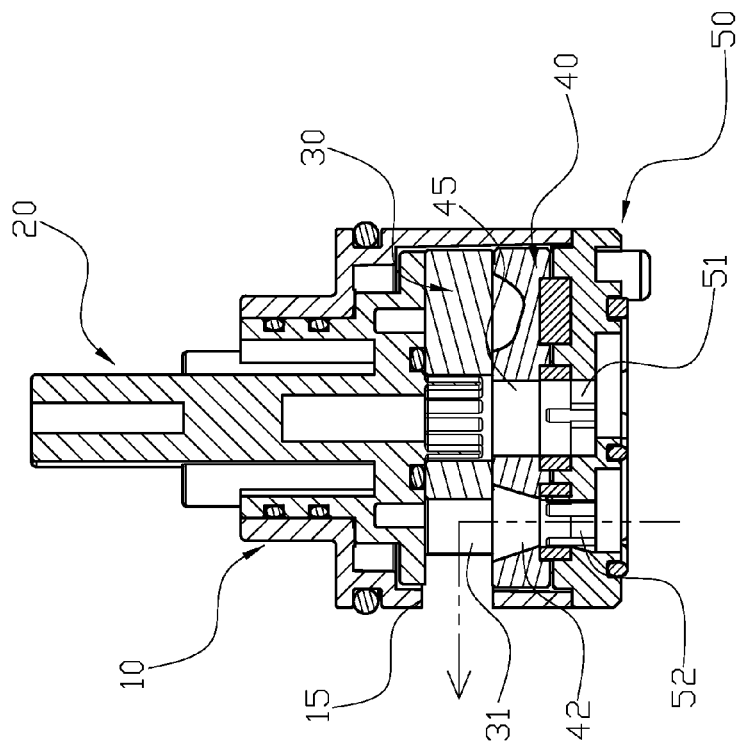
FIG. 11 illustrates a sectional view when the cold water is outputted from the front end of the faucet in the present invention.
Figure 10:
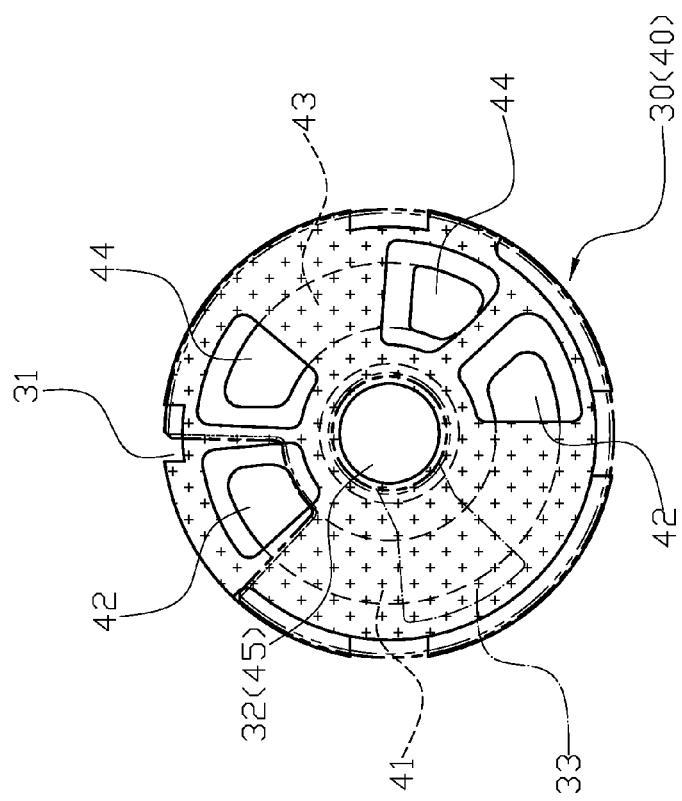
FIG. 10 illustrates a schematic view of the relationship between the upper and lower ceramic pieces when the cold water is outputted from the front end of the faucet in the present invention.
Figure 12:
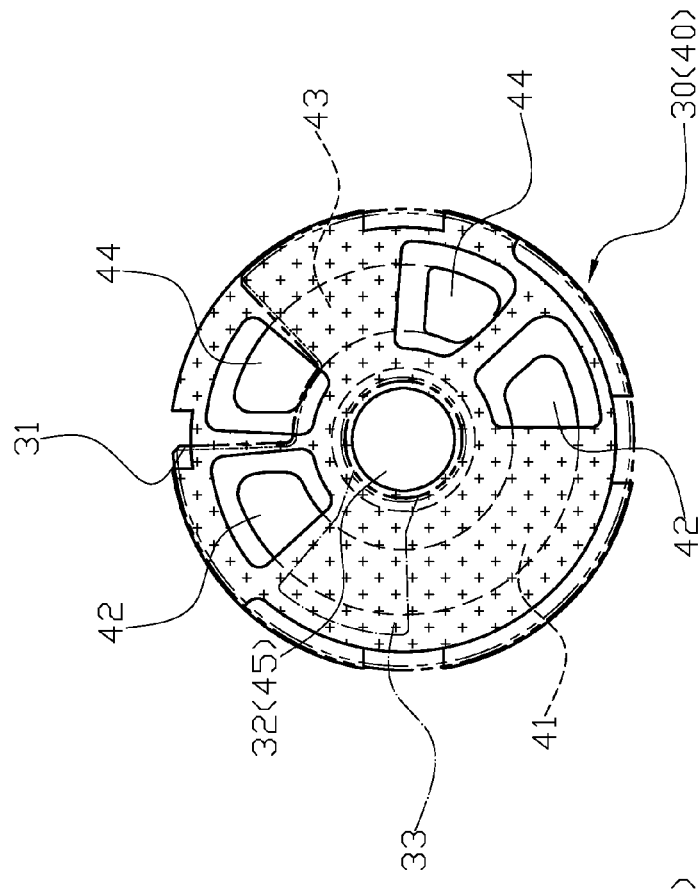
FIG. 12 illustrates a schematic view of the relationship between the upper and lower ceramic pieces when the cold and hot water is mixed and outputted from the front end of the faucet in the present invention.
Figure 13:
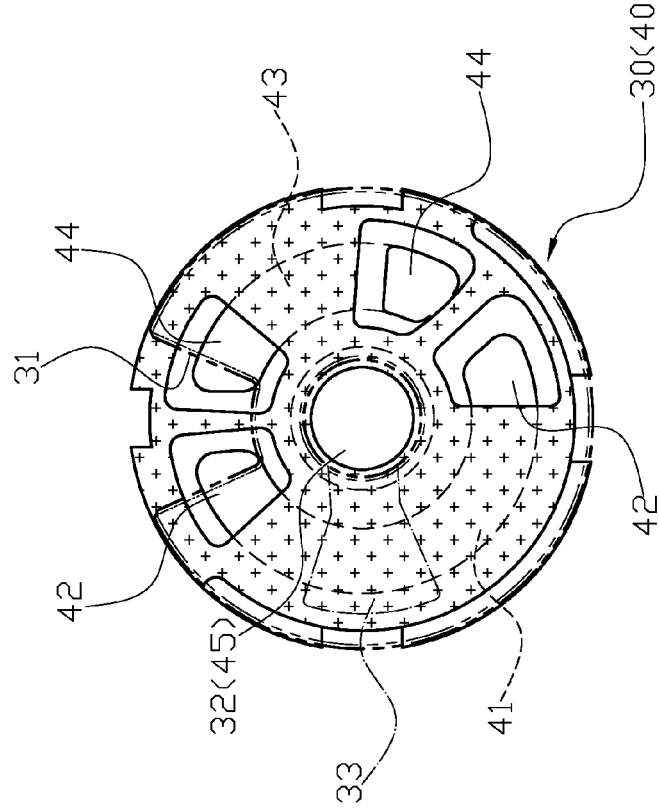
FIG. 13 illustrates a schematic view of the relationship between the upper and lower ceramic pieces when the hot water is outputted from the front end of the faucet in the present invention.

When the water is outputted from the front end of the faucet (60), the handle (61) can be rotated to one direction so that the valve stick (21) can drive the base (22) and upper ceramic piece (30) to rotate, and the water connecting hole (31) can align with one of the cold water through holes (42) to enable the cold water to flow from the cold water inlet channel (51), the first diverting slot (53), the cold water channel (41), one of the cold water through holes (42) and the water connecting hole (31), and flow out from the water outlet (15) of the valve shell (10) and the front water output portion (602) of the faucet (60) (see FIGS. 10 and 11). However, the rotation of the upper ceramic piece (30) cannot align the expanding portion (33) with the cold water through holes (42) and hot water through holes (44), so that the cold and hot water would not spray out from the water communicating hole (32), valve stick (21) and the connecting tube (64). If the user wants to use warm water or even hot water when the water is outputted from the front end, the user can keep rotating the handle (61) so the water connecting hole (31) can gradually overlap with one of the hot water through holes (44). The overlapped portion can be adjusted according to the extent of the rotation of the handle (61). When the water connecting hole (31) can simultaneously communicate with one of the cold water through holes (42) and hot water through holes (44) (see FIG. 12), the cold and hot water will be mixed to generate warm water. If the water connecting hole (31) does not overlap with the cold water through holes (42) at all, but covers the entire the hot water through holes (44) (see FIG. 13), the water is outputted as hot water. When the user wants to shut off the water, he/she can restore the handle (61) and the engaging element (24) will be pushed back to the positioning portion (14) by the spring.

Figure 15:
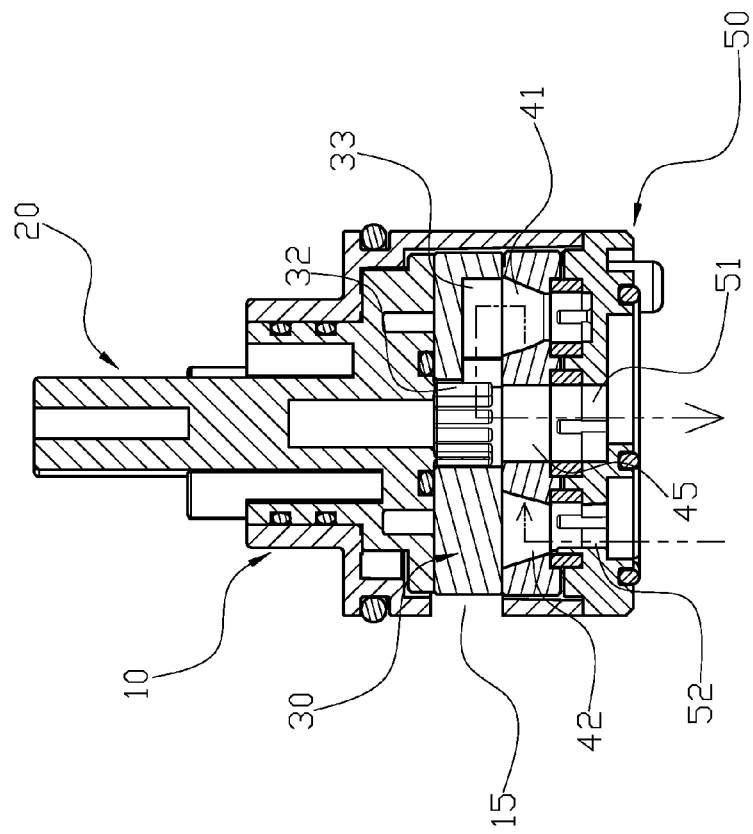
FIG. 15 illustrates a sectional view when the cold water is outputted from the top of the faucet in the present invention.
Figure 14:
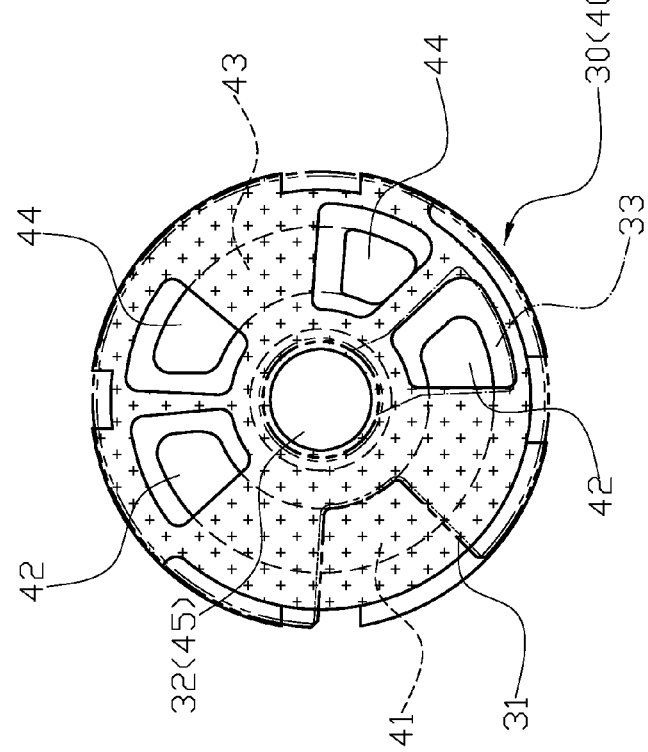
FIG. 14 illustrates a schematic view of the relationship between the upper and lower ceramic pieces when the cold water is outputted from top of the faucet in the present invention.
Figure 16:
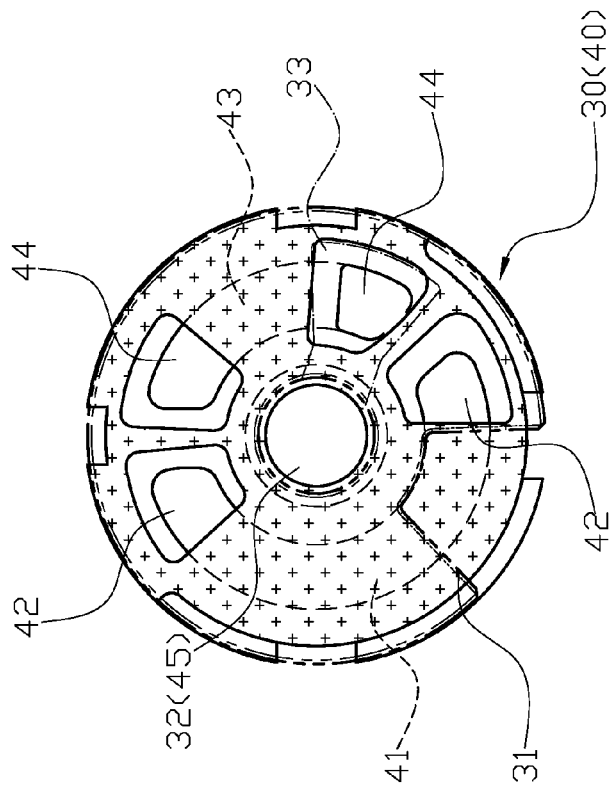
FIG. 16 illustrates a schematic view of the relationship between the upper and lower ceramic pieces when the cold and hot water is mixed and outputted from top of the faucet in the present invention.
Figure 17:
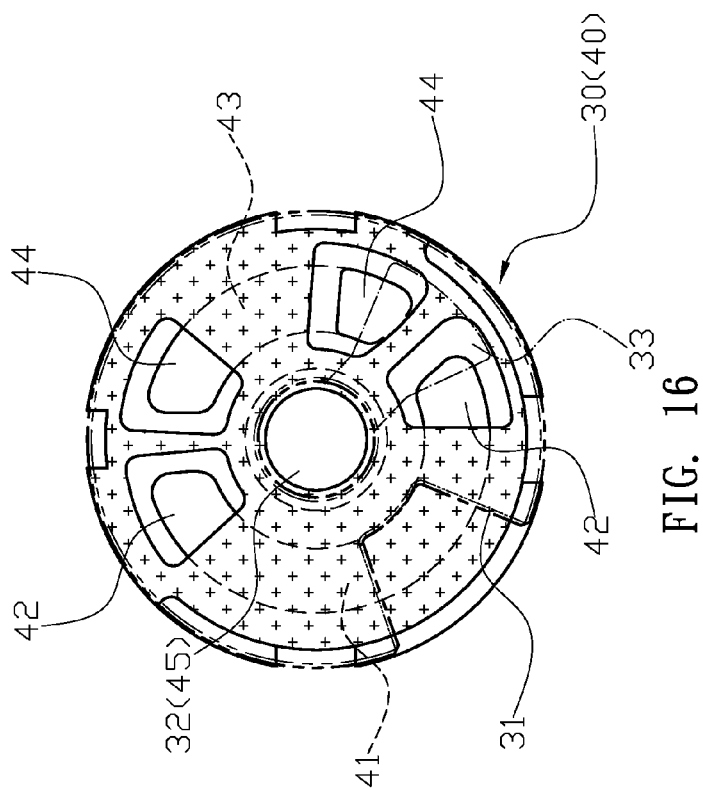
FIG. 17 illustrates a schematic view of the relationship between the upper and lower ceramic pieces when the hot water is outputted from top of the faucet in the present invention.

In another embodiment, if the user wants to output the water from the top of the faucet, he/she can rotate the handle (61) to the opposite direction, so that the expanding portion (33) can align with another cold water through hole (42), and the cold water can be sprayed out from the valve stick (21) and the connecting tube (64) (see FIGS. 14 and 15). Likewise, if the user wants to use warm water or even hot water, the user can keep rotating the handle (61) so the water connecting hole (31) can gradually overlap with another hot water through hole (44). The overlapped portion can be adjusted according to the extent of the rotation of the handle (61). When the water connecting hole (31) can simultaneously communicate with one of the cold water through holes (42) and hot water through holes (44) (see FIG. 16), the cold and hot water will be mixed to generate warm water. When the handle (61) is rotated to completely miss the cold water through hole (42), but covers the entire the hot water through holes (44) (see FIG. 17), the water is outputted as hot water. When the user wants to shut off the water, he/she can restore the handle (61) to its original position, and the contact of the protruding block (13) and blocking wall (222) can prevent the handle (61) from being overly rotated. It is noted that upper edge of the cold water through holes (42) and hot water through holes (44) can be expanded to a proper extent to facilitate the connection with the water source.

Figure 18:
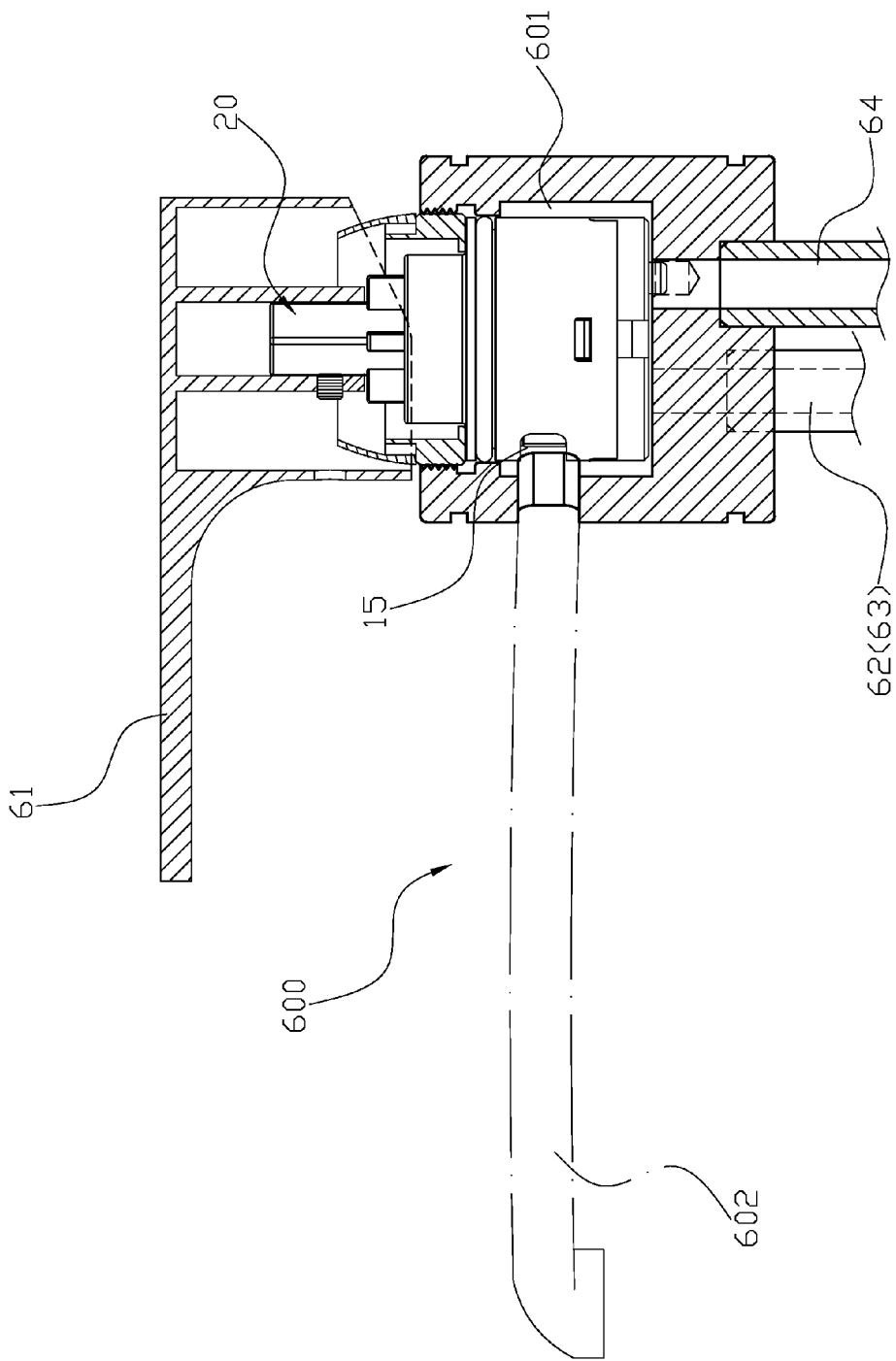
FIG. 18 illustrates a schematic view of one embodiment of the faucet in use in the present invention.

The ceramic control valve in the present invention can not only be installed in the shower faucet (60) or bathtub (see FIGS. 17 and 18), but also in faucet (600) used in kitchen sinks and water basins (see FIGS. 18 and 19). The faucet (600) is tubular, having the isolated space (601) for the ceramic control valve. Bottom of the faucet (600) has a water output hole (603), so the cold and hot water flowing out from the water outlet (15) of the valve shell (10) can be transferred through the isolated space (601) to flow out from the water output hole (603).

According to the embodiments described above, the present invention is advantageous because (i) the ceramic control valve can change the water output style of the faucet (60) without an additional handle, and the water output can be switched between the front and top portions to effectively reduce the components of the faucets (60) and simplify the assembly process; (ii) there is no additional handle protruding from the faucet (60) to increase the aesthetic value of the faucet; and (iii) the faucet (60) does not have to be operated with the additional handle to avoid unnecessary water output due to inadvertent touch of the additional handle.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A ceramic control valve of a faucet comprising a valve shell that orderly includes a water control unit, an upper ceramic piece, a lower ceramic piece and a valve base connected underneath, wherein a receiving space is in the valve shell and a through hole is on top of the valve shell, and the water control unit is disposed in the receiving space, an upper portion of the water control unit protruding out of the valve shell from the through hole;

wherein at least one water outlet in the receiving space passes through the valve shell, and the water control unit has one tubular and hollow valve stick secured at a base to facilitate the rotation of the valve stick that drives the base to rotate;

wherein a water connecting hole is formed at an inner edge of the upper ceramic piece, and a water communicating hole is formed at center portion thereof, and an expanding portion is disposed at one side of the water communicating hole, and through the formation of the expanding portion, the diameter of an upper portion of the water communicating hole is larger than lower portion thereof;

wherein a bottom surface of the lower ceramic piece has one cold water channel and a hot water channel, and both sides of the cold water channel have a cold water through hole and both sides of the hot water channel have a hot water through hole to pass through the lower ceramic piece; and wherein the valve base has a cold water inlet channel and a hot water inlet channel, and the cold water inlet channel and hot water inlet channel are connected to a first diverting slot and a second diverting slot respectively to transport the cold and hot water to the other side, and the upper ceramic piece, lower ceramic piece and valve base are orderly stacked together and put into the receiving space of the valve shell, so that the lower ceramic piece is secured at the valve base, while the upper ceramic piece is connected to the base; and when the lower ceramic piece and the valve base are stacked with each other, the first diverting slot and the second diverting slot aligned with the cold water channel and hot water channel of the lower ceramic piece respectively.

2. The ceramic control valve of a faucet of claim 1, wherein two protruding blocks disposed in the valve shell are spaced with a predetermined rotating angle, and an outer periphery of the base has a connecting block with an arc edge, and both sides thereof are used as a blocking wall.

3. The ceramic control valve of a faucet of claim 1, wherein an arc-shaped positioning portion is disposed between a rotating path between the two protruding blocks, and an engaging element pushed by a spring is located at the base of the water control unit.

4. The ceramic control valve of a faucet of claim 1, wherein a driving leg is protruding from a bottom surface of the base and a connecting recessed slot is disposed at a top surface of the upper ceramic piece, and when the upper ceramic piece is attached to a top surface of the lower ceramic piece and put into the receiving space together, the driving leg of the water control unit plugs into the connecting recessed slot.

5. The ceramic control valve of a faucet of claim 1, wherein a plurality of engaging slots are formed at a periphery of the lower ceramic piece, and a upward and protruding hook is formed at the valve base, which is used to secured the lower ceramic piece and upper ceramic piece.

6. The ceramic control valve of a faucet of claim 1, wherein a gasket is disposed in the cold water inlet channel, the hot water inlet channel, the first diverting slot and the second diverting slot.

7. The ceramic control valve of a faucet of claim 1, wherein a water outlet hole is at center of the lower ceramic piece.

* * * * *